(12) United States Patent
Takakuwa

(10) Patent No.: US 7,536,505 B2
(45) Date of Patent: May 19, 2009

(54) STORAGE SYSTEM AND METHOD FOR CONTROLLING BLOCK REARRANGEMENT

(75) Inventor: Masayuki Takakuwa, Kunitachi (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 202 days.

(21) Appl. No.: 11/080,823

(22) Filed: Mar. 16, 2005

(65) Prior Publication Data

US 2005/0216665 A1 Sep. 29, 2005

(30) Foreign Application Priority Data

Mar. 29, 2004 (JP) ............... 2004-096468

(51) Int. Cl.
*G06F 12/00* (2006.01)
*G06F 13/00* (2006.01)
*G06F 13/28* (2006.01)

(52) U.S. Cl. ...................... 711/114; 711/170
(58) Field of Classification Search .................. 711/114
See application file for complete search history.

(56) References Cited

U.S. PATENT DOCUMENTS

| 5,930,828 | A * | 7/1999 | Jensen et al. ................. 711/170 |
| 5,956,745 | A * | 9/1999 | Bradford et al. ............. 711/137 |
| 6,397,311 | B1 * | 5/2002 | Capps ......................... 711/165 |
| 6,564,228 | B1 * | 5/2003 | O'Connor ................... 707/200 |
| 7,376,786 | B2 * | 5/2008 | Williams ..................... 711/112 |
| 2003/0101383 | A1 * | 5/2003 | Carlson ........................ 714/42 |

FOREIGN PATENT DOCUMENTS

| CN | 1445674 A | 10/2003 |
| JP | 6-250793 | 9/1994 |
| JP | 10-289063 | 10/1998 |
| JP | 2000-200207 | 7/2000 |
| JP | 2001-67187 | 3/2001 |
| WO | WO 03/017107 | 2/2003 |

OTHER PUBLICATIONS

The Authoritative Dictionary of IEEE standards terms, Seventh Edition, 2000, p. 323.*
Microsoft Computer Dictionary, 2002, Microsoft Press, Fifth Edition, p. 168.*

(Continued)

*Primary Examiner*—Reba I. Elmore
*Assistant Examiner*—Prasith Thammavong
(74) *Attorney, Agent, or Firm*—Finnegan, Henderson, Farabow, Garrett & Dunner, L.L.P.

(57) ABSTRACT

A fragmentation information collecting section in a file system control section collects fragmentation information on a target volume for which a fragmentation state is to be eliminated, the target volume being managed by a file system. An analysis section in the file system control section analyzes the fragmentation state of the target volume on the basis of the fragmentation information collected, to generate block rearrangement information required to eliminate the fragmentation state of the target volume. A block rearrangement command generating section in the file system control section generates a block rearrangement command row corresponding to the block rearrangement information. A disk array control device executes the block rearrangement command row to eliminate the fragmentation state of the target volume.

3 Claims, 11 Drawing Sheets

OTHER PUBLICATIONS

Diskeeper for Windows User Manual, Aug. 2003.*
Weber; "ANSI T10 SCSI-3 Extended Copy Command for SPC-2"; LSI Logic, pp. 1-41, http://www.t10.org, (1999).
Notification of Second Office Action mailed Sep. 21, 2007, in corresponding Chinese Application No. 200510053882.9.
Notification of Reasons for Rejection Mailed Oct. 17, 2007, in corresponding Japanese Application No. 2004-096468.
Japanese Version of the Notification of Reasons for Rejection Mailed Oct. 17, 2007, in Japanese Application No. 2004-096468.

* cited by examiner

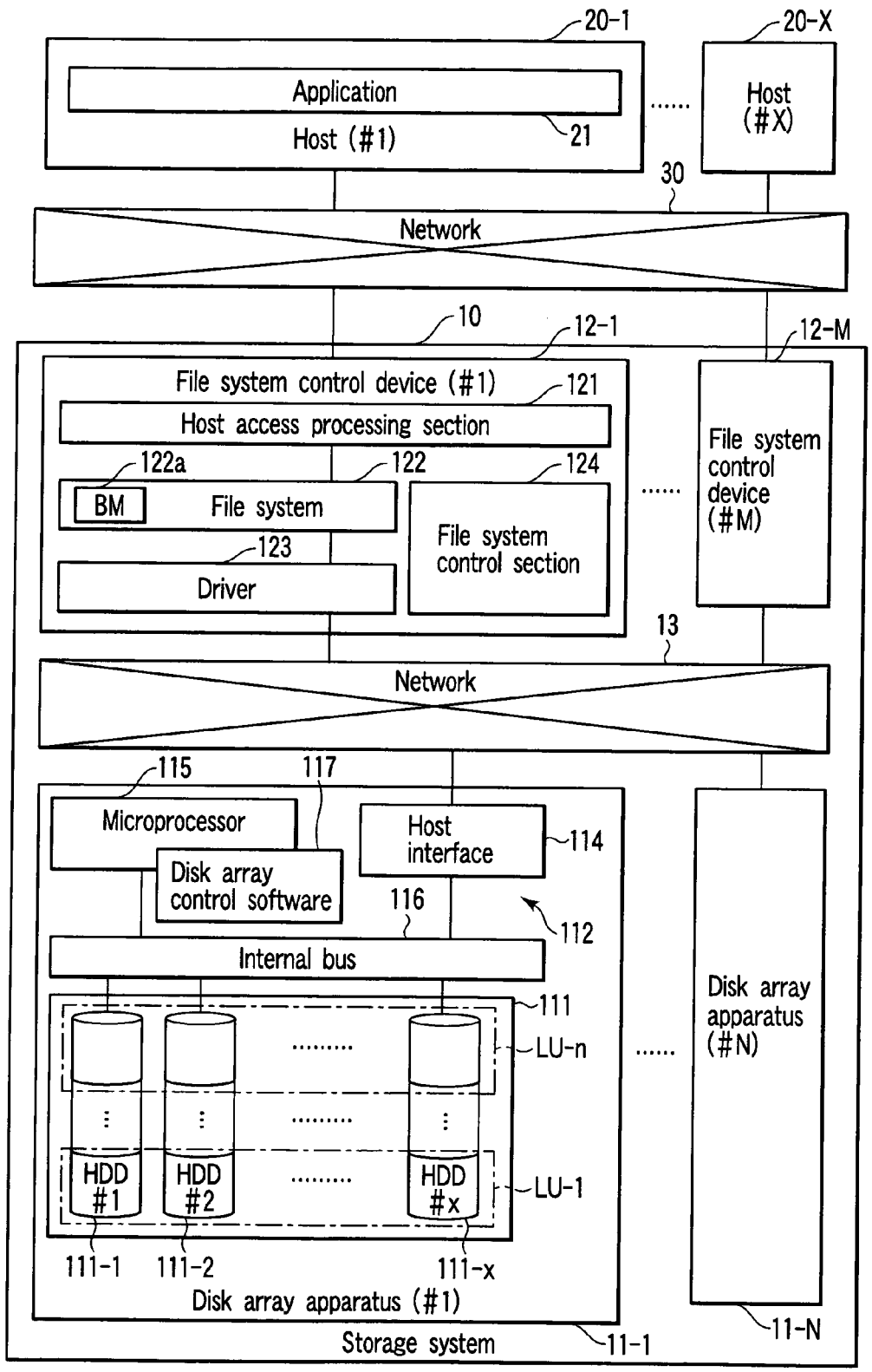
F I G. 1

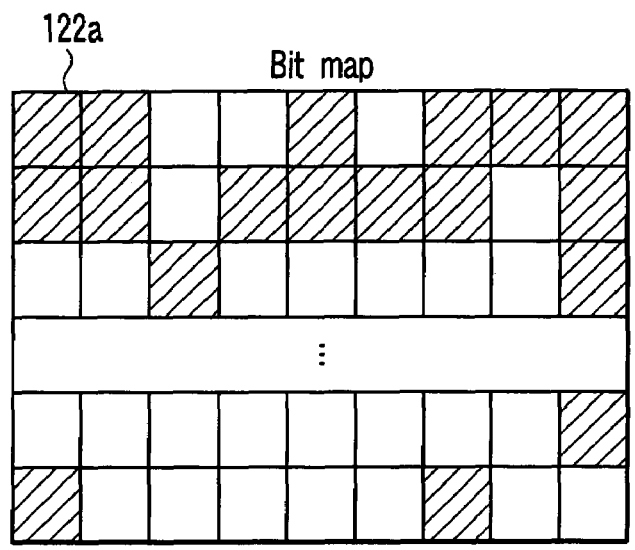
F I G. 2
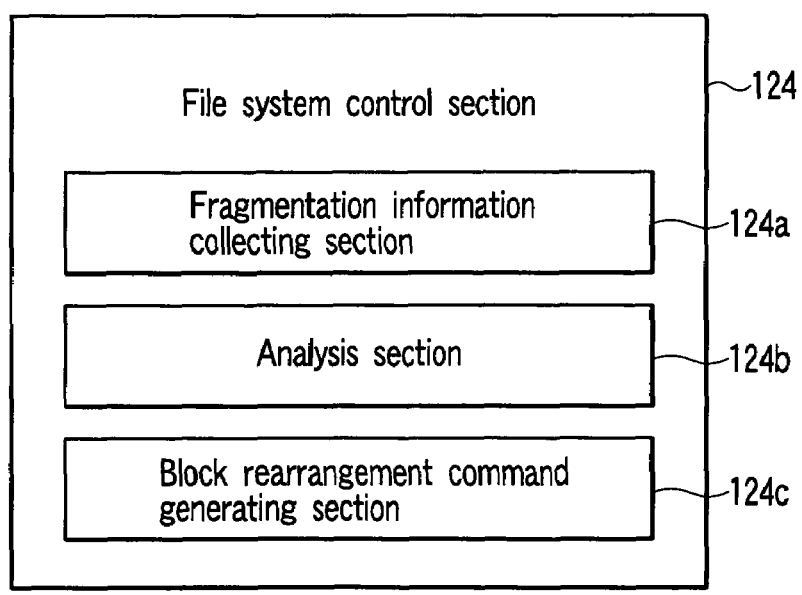
F I G. 3

STORAGE SYSTEM AND METHOD FOR CONTROLLING BLOCK REARRANGEMENT

CROSS-REFERENCE TO RELATED APPLICATIONS

This application is based upon and claims the benefit of priority from prior Japanese Patent Application No. 2004-096468, filed Mar. 29, 2004, the entire contents of which are incorporated herein by reference.

BACKGROUND OF THE INVENTION

1. Field of the Invention

The present invention relates to a storage system including a disk array apparatus and a file system control device which receives an access request from a host computer and which then outputs the request to the disk array apparatus, and in particular, to a storage system and a method for controlling volume rearrangement in which a high-speed access control function of a disk array control device in the disk array apparatus is utilized to eliminate a fragmentation state of a volume.

2. Description of the Related Art

A storage system is generally connected via a network or a channel network to a host computer (referred to as a host below) utilizing the system. The storage system includes a disk device (storage device). A hard disk drive (HDD) is generally used for the disk device. The storage system also includes a file server typified by a network file system (NFS) server. A file system of the file server receives a disk access request from an application (application software) operating on a host. Thus, a disk access conforming to the disk access request from the application (host) is executed via the file system. The disk access causes creation/deletion of a volume specified by the application (host), an increase or reduction in file size, or the like. Then, in the volume, a state called "fragmentation" occurs in which blocks which are units of disk accesses are used in a vermiculate manner. In the fragmentation state, the rate of the whole volume taken up by areas being actually used decreases. Further, physically inconsecutive blocks are used. Consequently, during a volume access, the disk device (HDD) is inconsecutively accessed. This may degrade the performance of the system.

Thus, a process (fragmentation eliminating process or defragmentation process) called defragmentation has hitherto been executed in order to eliminate the fragmentation state. This process is executed by software in the host or file server in accordance with fragmentation information managed on the host or file server. This process moves data by executing a read or write only on blocks in use in a volume. The blocks in use are rearranged so as to be physically consecutive.

However, since the fragmentation eliminating process (defragmentation process) moves data in blocks, it takes a long time to eliminate the fragmentation state. Further, an increased load is imposed on the host or file server. This also affects the execution of a disk access in response to a normal disk access request from the application. As a result, the throughput of the whole system decreases.

Thus, a technique has been proposed which uses a hierarchical management file apparatus corresponding to the file system to make the volume hierarchical on the basis of multiple types of recording unit lengths for management (see, for example, Japanese Patent No. 2000-200207 (Paragraphs 0033 to 0035 and FIG. 2)). In this case, the volume is divided into clusters of a first recording unit length for management. Each cluster is divided into fragments of a second recording unit length that is smaller than the first recording unit length. A file allocation table (FAT), that is, a file arrangement management table, is used as fragmentation information to manage the clusters and fragments. The technique described in this document switches the recording unit length to be applied between a large-sized file for videos or sounds, which must be continuously reproduced, and a small-sized file for sentences, which may be discretely reproduced. This makes it possible to reduce the occurrence of the fragmentation state.

However, even with the technique described in the above document, in order to eliminate the fragmentation state, it is necessary that the hierarchical management file apparatus corresponding to the file system move data by executing a read or write on the clusters or fragments used in the volume in accordance with the fragmentation information (file arrangement management table) managed by the hierarchical management file apparatus. In this case, it takes a long time to eliminate the fragmentation state. Further, an increased load is imposed on the hierarchical management file apparatus (file system). As a result, the throughput of the whole system decreases.

Further, in the fragmentation state, areas being actually used in the volume (a group of blocks being actually used) become inconsecutive. Thus, even if the volume has a size of 1 GB and the group of blocks being actually used (blocks in use) has a total size of 100 MB, when the blocks in the group are inconsecutive and distributive, the volume of size 1 GB cannot be reduced to a volume of size 100 MB without the fragmentation eliminating process. In this case, a storage resource for 900 MB which is otherwise available cannot be effectively utilized.

A storage system has recently emerged which includes a disk array apparatus including a plurality of disk devices (storage devices). Further, a storage system has emerged which includes a plurality of disk array apparatuses. A storage system of this kind is often shared by a plurality of hosts. In a system in which a plurality of hosts share a storage system including a disk array apparatus, applications operating independently on the respective hosts make utilization requests for independent storage resources. The storage resource requested by each application is a set of disk areas provided by a plurality of disk devices and corresponding to the utilization request from the application. Accordingly, the total amount of storage resource required for the whole utilization request from each application increases when the disk areas are not efficiently used as in the case of the fragmentation state. Thus, it is desirable to effectively utilize storage resources.

Further, if the system does not have a function for increasing or reducing the volume size but has only a function for causing a plurality of logical units provided by a disk array to appear like one volume (a function for concatenating logical units), when fragmentation occurs in the plurality of logical units, none of the logical units can be released. Consequently, it is impossible to reduce the size to one being actually used.

For the storage system, it is thus desired to promptly eliminate the fragmentation state in a volume without increasing the load on the host and file system, by utilizing the high-speed access control function of the disk array control device, which controls the disk array, to physically move data required to eliminate the fragmentation state in the volume.

BRIEF SUMMARY OF THE INVENTION

According to one aspect of the present invention, there is provided a storage system, comprising: a disk array apparatus having a disk array control device which controls a disk array includes a plurality of disk devices and which analyzes a file-level access request from a host computer to convert the file-level access request into an access request for one of the plurality of disk devices which correspond to the file-level access request; and a file system control device including a file system which manages a file specified in the access request from the host computer, the file system control device receiving the access request from the host computer to output the request to the disk array apparatus, the file system control device comprising: a fragmentation information collecting section which collects, from the file system, fragmentation information indicative of usage of blocks in a target volume for which a fragmentation state is to be eliminated, the target volume being included in those volumes in which the file managed by the file system is stored; an analysis section which analyzes the fragmentation state of the target volume on the basis of the fragmentation information collected by the fragmentation information collecting section, to generate block rearrangement information required to rearrange blocks in use in the target volume, in consecutive areas in the volume; and a block rearrangement command generating section which generates a block rearrangement command row required to cause the disk array control device to execute block rearrangement indicated by the block rearrangement information, the block rearrangement command generating section issuing the command row to the disk array control device, the disk array control device comprising a block rearranging section which controls the disk array in accordance with the block rearrangement command row issued by the block rearrangement command generating section, to execute a block rearranging process of moving the data in the blocks in use in the target volume to the consecutive areas.

According to another aspect of the present invention, there is provided a method of controlling block rearrangement, the method being used in a storage system comprising a disk array apparatus having a disk array control device which controls a disk array includes a plurality of disk devices and which analyzes a file-level access request from a host computer to convert the file-level access request into an access request for one of the plurality of disk devices which correspond to the file-level access request, and a file system control device including a file system which manages a file specified in the access request from the host computer, the file system control device receiving the access request from the host computer to output the request to the disk array apparatus, the disk array control device being used to execute block rearrangement required to eliminate a fragmentation state, the method comprising: collecting, from the file system, fragmentation information indicative of usage of blocks in a target volume for which the fragmentation state is to be eliminated, the target volume being included in those volumes in which the file managed by the file system is stored; analyzing the fragmentation state of the target volume on the basis of the collected fragmentation information; generating block rearrangement information required to rearrange blocks in use in the target volume, in consecutive areas in the volume; generating a block rearrangement command row required to cause the disk array control device to execute block rearrangement indicated by the generated block rearrangement information; and issuing the generated command row to the disk array control device to cause the disk array control device to execute a block rearranging process of moving the data in the blocks in use in the target volume to the consecutive areas.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a computer system according to an embodiment of the present invention;

FIG. 2 is a diagram showing an example of a bit map 122a applied according to the embodiment;

FIG. 3 is a block diagram showing the configuration of a file system control section 124 in FIG. 1;

DETAILED DESCRIPTION OF THE INVENTION

Figure 4:
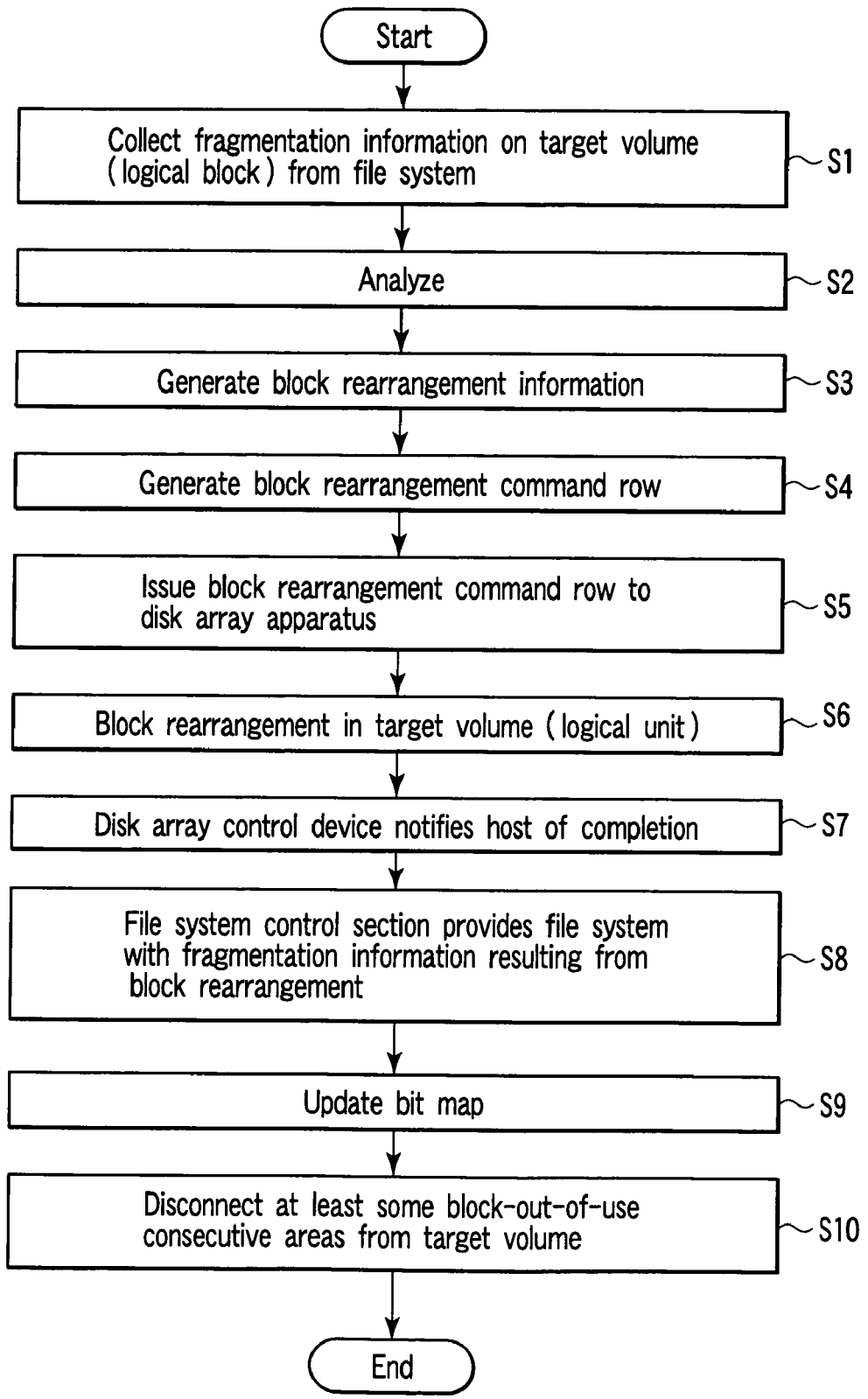
FIG. 4 is a flowchart showing an operation procedure according to the embodiment.

Embodiments of the present invention will be described below with reference to the drawings.

FIG. 1 is a block diagram showing the configuration of a computer system according to an embodiment of the present invention. The system in FIG. 1 includes a storage system 10 and X hosts (host computers) 20-1 to 20-X that share the storage system. The storage system 10 and the hosts 20-1 to 20-X are interconnected by, for example, a network 30. The network 30 is, for example, a storage area network (SAN) or the Ethernet (registered trademark). A channel network such as an SCSI (Small Computer System Interface) bus or fibre channel (FC) can be used in place of the network 30.

The storage system 10 includes at least one disk array apparatus, for example, N disk array apparatuses 11-1(#1) to 11-N(#N), and at least one file system control device, for example, M multiplexed file system control devices 12-1(#1) to 12-M(#M). The disk array apparatuses 11-1 to 11-N and the file system control devices 12-1 to 12-M are interconnected by a network 13. The network 13 is, for example, a storage area network (SAN) or the Ethernet (registered trademark). A channel network such as an SCSI bus or FC can be used in place of the network 13.

An application (application software) 21 operates on the host 20-1. Applications also operate on the others of the hosts 20-1 to 20-X. Each of the hosts 20-1 to 20-X issues a file-level access request (read/write request) to any of the file system control devices 12-1 to 12-M in accordance with the application.

The disk array apparatus 11-1 includes a disk array 111 and a disk array control device 112. Although not shown in the figure, the others of the disk array apparatuses 11-1 to 11-N have a configuration similar to that of the disk array apparatus 11-1. The disk array 111 includes a plurality of disk devices, for example, x HDDs 111-1 to 111-N of a RAID (Redundant Array of the Independent Disks or Redundant Array of the Inexpensive Disks) configuration. HDDs 111-1 to 111-N constituting the disk array 111 are called member HDDs of the disk array 111. The disk area of the disk array 111 realized by the member HDDs 111-1 to 111-N is managerially divided into areas of a pre-specified size called stripe groups. The area of one stripe group includes areas (stripes) of a fixed size which have the same physical address, the areas being present in the member HDDs 111-1 to 111-N. The figure shows how the disk area of the disk array 111 is assigned to n logical units LU-1 to LU-n. Each of the logical units LU-1 to LU-n is a set of stripe groups. The usage of LU-1 to LU-n is managed in terms of areas of a fixed size called blocks. It is not always necessary that the same HDD group provide the disk area assigned to the logical units LU-1 to LU-n. In other words, different combinations of (the disk areas of) HDD groups may be assigned to the logical units LU-1 to LU-n.

The disk array control device 112 controls the disk array 111 in accordance with access requests provided by the hosts 20-1 to 20-X via the file system control devices 12-1 to 12-M. The disk array control device 112 includes a host interface 114, an HDD (disk) interface (not shown), a microprocessor 115, and an internal bus 116. The host interface 114 interfaces with the hosts 20-1 to 20-X. The HDD interface interfaces with each of the HDD 111-1 to 111-x in the disk array 111. The microprocessor 115 is a main controller for the disk array control device 112. Disk array control software 117 operates on the microprocessor 115. In FIG. 1, a storage device in which the disk array control software 117 is stored (installed) is omitted. Upon receiving a file-level read/write request from (the application operating on) any of the hosts 20-1 to 20-X, the microprocessor 115 analyzes the request. The microprocessor 115 then converts the request into a read/write request for the HDD in the disk array which corresponds to the request. The microprocessor 115 then outputs the resulting request to the HDD.

The file system control device 12-1 has a host access processing section 121, a file system 122, a driver 123, and a file system control section 124. Although not shown in the figure, the others of the file system control devices 12-1 to 12-N have a configuration similar to that of the file system control device 12-1.

The host access processing section 121 receives a file-level read/write request from any of the hosts 20-1 to 20-X.

The file system 122 has a well-known function for managing a file specified by the read/write request received by the host access processing section 121. The file system 122 uses the bit map (BM) 122a stored in, for example, a storage device (not shown) to manage a volume in which the file is stored, in block units. FIG. 2 shows an example of the bit map 122a. In the example in FIG. 2, the bit map 122a is shown like a lattice. Each section of the lattice shows a block. Shaded sections indicate blocks being used (referred to as blocks in use below). Non-shaded sections indicate sections not being used (referred to as blocks out of use below). That is, the bit map 122a is block-in-use information (referred to as fragmentation information below) indicating whether or not each block is being used. Bit maps similar to the one 122a are held in the file systems of all the file system control devices except the one 12-1. Communications among the file system control devices 12-1 to 12-N allow the bit maps held in the file systems of the file system control devices 12-1 to 12-N are to maintain the same contents.

The driver 123 accesses any of the disk array apparatuses 11-1 to 11-N via the network or channel (in this case, the network 13) in accordance with a request from the file system 122 or the file system control section 124.

The file system control section 124 is implemented when the file system control device reads and executes file system control software (file system control program) installed in the file system control device 12-1. This software can be distributed by storing it in a computer readable storage medium (a magnetic disk typified by a floppy (registered trade mark) disk, an optical disk typified by CD-ROM or DVD, a semiconductor memory typified by a flash memory, or the like). Alternatively, this program may be downloaded (distributed) via a network.

FIG. 3 is a block diagram showing the configuration of the file system control section 124. The file system control section 124 includes a fragmentation information collecting section 124a, an analysis section 124b, and a block rearrange command generating section 124c. The fragmentation information collecting section 124a collects fragmentation information on each of the volumes managed by the file system 122. The analysis section 124b analyzes fragmentation information collected by the fragmentation information collecting section 124a to determine a block rearranged state required to eliminate the fragmentation state in the corresponding state. The block rearrangement command generating section 124c generates a block rearrangement command corresponding to an instruction for block movement required to realize the block rearranged state determined by the analysis section 124b. This command is sent, via the drive 123, to a disk array apparatus 11-i (i is one of l to N) having the corresponding volume.

Now, operations in the system in FIG. 1 will be described with reference to the flowchart in FIG. 4.

Figure 5A:
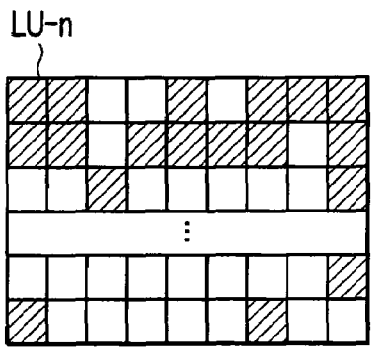
FIGS. 5A and 5B are diagrams showing a comparison of a fragmentation state in a logical unit LU-n with a state in which the fragmentation state has been eliminated.

It is assumed that one of the hosts 20-1 to 20-X, for example, the host 20-1, requests that one of the file system control devices 12-1 to 12-M, for example, the file system control device 12-1, eliminate the fragmentation state in a volume (referred to as a target volume below) having, for example, only a logical unit LU-n in the disk array apparatus 11-1 as a constituent member. Then, the fragmentation information collecting section 124a in the file system control section 124, provided in the file system control device 12-1, collects fragmentation information indicating the fragmentation state in the target volume (that is, the logical unit LU-n), from the bit map 122a managed by the file system 122 (step S1). FIG. 5A shows the fragmentation state in the logical unit LU-n, indicated by the fragmentation information.

Figure 5B:
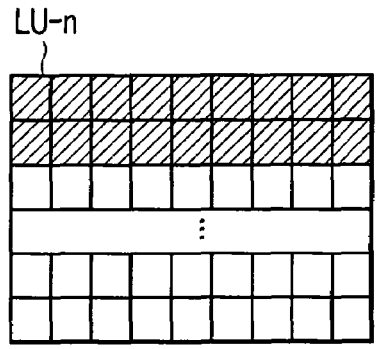

The analysis section 124b in the file system control section 124 analyzes the fragmentation state in the logical unit LU-n on the basis of the fragmentation information collected by the fragmentation information collecting section 124a (step S2). On the basis of the results of analysis of the fragmentation state shown in FIG. 5A, the analysis section 124b generates block rearrangement (movement) information required to eliminate the fragmentation state, that is, to rearrange blocks in use arranged in inconsecutive areas in the logical unit LU-n to obtain consecutive areas in the logical unit LU-n, for example, as shown in FIG. 5B (step S3).

Figure 6:
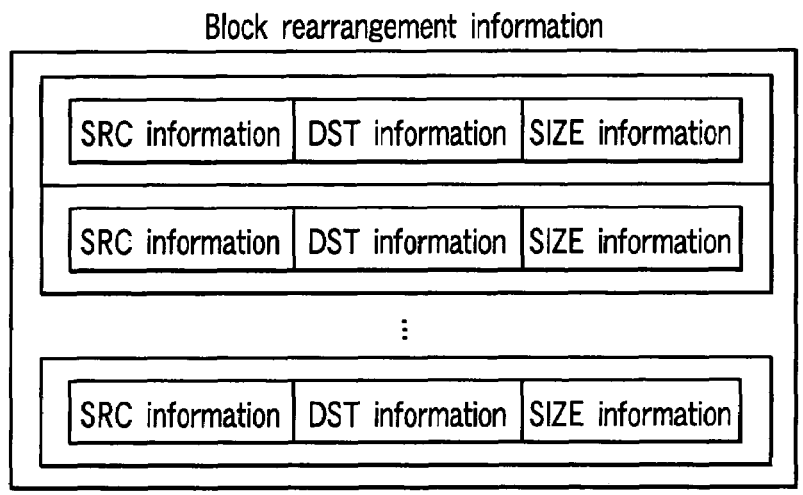
FIG. 6 is a diagram showing an example of the format of block rearrangement information.

FIG. 6 shows an example of the format of block rearrangement (movement) information. The block rearrangement information in FIG. 6 includes, for each row of blocks in use in the logical unit LU-n (for inconsecutive blocks in use, for each block), a set of source information SRC required to identify the block-in-use row, that is, the target for rearrangement (movement), destination information DTS required to identify a destination of rearrangement (movement) of the block-in-use row, and size information SIZE indicative of the size (number of blocks) of the block-in-use row. In other words, the block rearrangement information is a list of the source information SRC, destination information DTS, and size information SIZE. Each of the source information SRC and the destination information DST includes a volume ID (identification information) required to identify the target volume and the relative block address, in the volume, of a leading block of the block-in-use row intended for rearrangement. The volume ID contains an IP (Internet Protocol) address and an ID corresponding to the number (LU number) of the constituent member (logical unit) of the target volume if the disk array apparatus 11-1 is connected to the file system control device 12-1 via the network 13 as in the present embodiment. In contrast to the present embodiment, if the disk array apparatus 11-1 is connected to the file system control device 12-1 via a channel network such as SCSI, the volume ID contains an ID corresponding to SCSI-ID and an ID corresponding to the LU number. It is possible to add disk additional information, for example, information indicating the speed of the disk in the corresponding HDD, to the set of SRC, DTS, and SIZE.

The block rearrangement information generated by the analysis section 124b is passed to the block rearrangement command generating section 124c in the file system control section 124. The block rearrangement command generating section 124c generates a command row required for block rearrangement, from the block rearrangement information (step S4). The command row (block rearrangement command row) generated by the block rearrangement command generating section 124 is passed to the driver 123 in the file system control section 124. The driver 123 issues the block rearrangement command row to the disk array apparatus 11-1 via the network 13 (step S5).

Figure 7A:
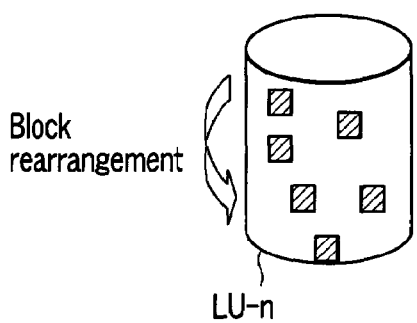
FIGS. 7A and 7B are diagrams showing examples of block rearrangement in the logical unit LU-n.

Upon receiving the block rearrangement command row issued by the driver 123, the disk array control device 112 in the disk array apparatus 11-1 functions as block rearranging means to execute the command row in accordance with the disk array control software 117. Thus, the disk array control device 112 executes a block rearranging process of placing (moving) the data in each block-in-use row (or blocks in use) in the logical unit LU-n, at the specified rearrangement destination in the logical unit LU-n (step S6). FIG. 7A shows how the data in the blocks in use in the logical unit LU-n are moved, that is, how block rearrangement is carried out. The block rearrangement shown in FIG. 7A is implemented by reading the data in the block-in-use row (or blocks in use) intended for the block rearrangement and writing the read data to the block rearrangement destination. Thus, in the present embodiment, by utilizing the disk access control function of the disk array control device 112 to move data, it is possible to promptly eliminate the fragmentation state compared to the case in which the host 20-1 moves data by reading and writing the data in block units.

Figure 7B:
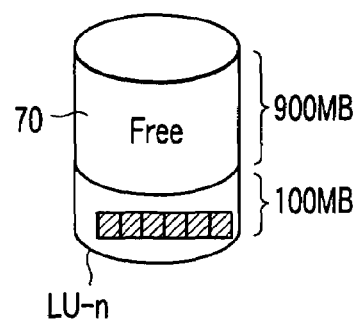

FIG. 7B shows that the fragmentation state in the logical unit LU-n has been eliminated as a result of execution of all of the block rearrangement command row. In this state, the blocks in use are arranged in consecutive areas in the logical unit LU-u. Thus, the logical unit LU-n is provided with a free area (block-out-of-use consecutive area) 70 in which only blocks out of use are consecutively arranged. Here, it is assumed that the logical unit Lu-n has a size of 1 GB and that a part of the logical unit occupied by the blocks in used has a size of 100 MB. Then, a block-out-of-use consecutive area 70 of up to 900 MB is provided.

Moreover, in the present embodiment, data read in accordance with a block rearrangement command is not always immediately written to the block rearrangement destination. In general, the disk array control device 112 has a write buffer (not shown) that holds an amount of data for one stripe group to be written to the disk array 111. Data read from the disk array 111 in response to the block rearrangement command are held in the write buffer. Once data in the rearrangement target blocks have been stored in the write buffer in an amount corresponding to one stripe group, the data for one stripe group are written to the disk array 111 all together. This makes it possible to further promptly eliminate the fragmentation state.

Once the disk array control device 112 has executed all of the block rearrangement command row, it notifies the host 20-1 of completion of the block rearrangement (step S7). In response to the notification of block rearrangement completion transmitted by the disk array control device 112 to the host 20-1, the file system control section 124 in the file system control section 12-1 provides the file system 122 with fragmentation information indicative of the usage status of each block after the block rearrangement (step S8).

The file system 122 updates the bit map 122a managed by itself in accordance with the notification from the file system control section 124 (step S9). This update is also reflected in the bit maps held in the file systems of all the file control devices except the one 12-1. Further, on the basis of the fragmentation information provided by the file system control section 124, the file system 122 detects the block-out-of-use consecutive area 70. The file system 122 then disconnects the entire area 70 or some consecutive areas in the area 70 from the target volume (logical unit LU-n). The file system 122 then reduces the capacity (size) of the volume (step S10). Thus, the file system 122 can assign the block-out-of-use consecutive area disconnected from the target volume to another volume to increase the capacity of the latter.

[First Variation]

Figure 8:
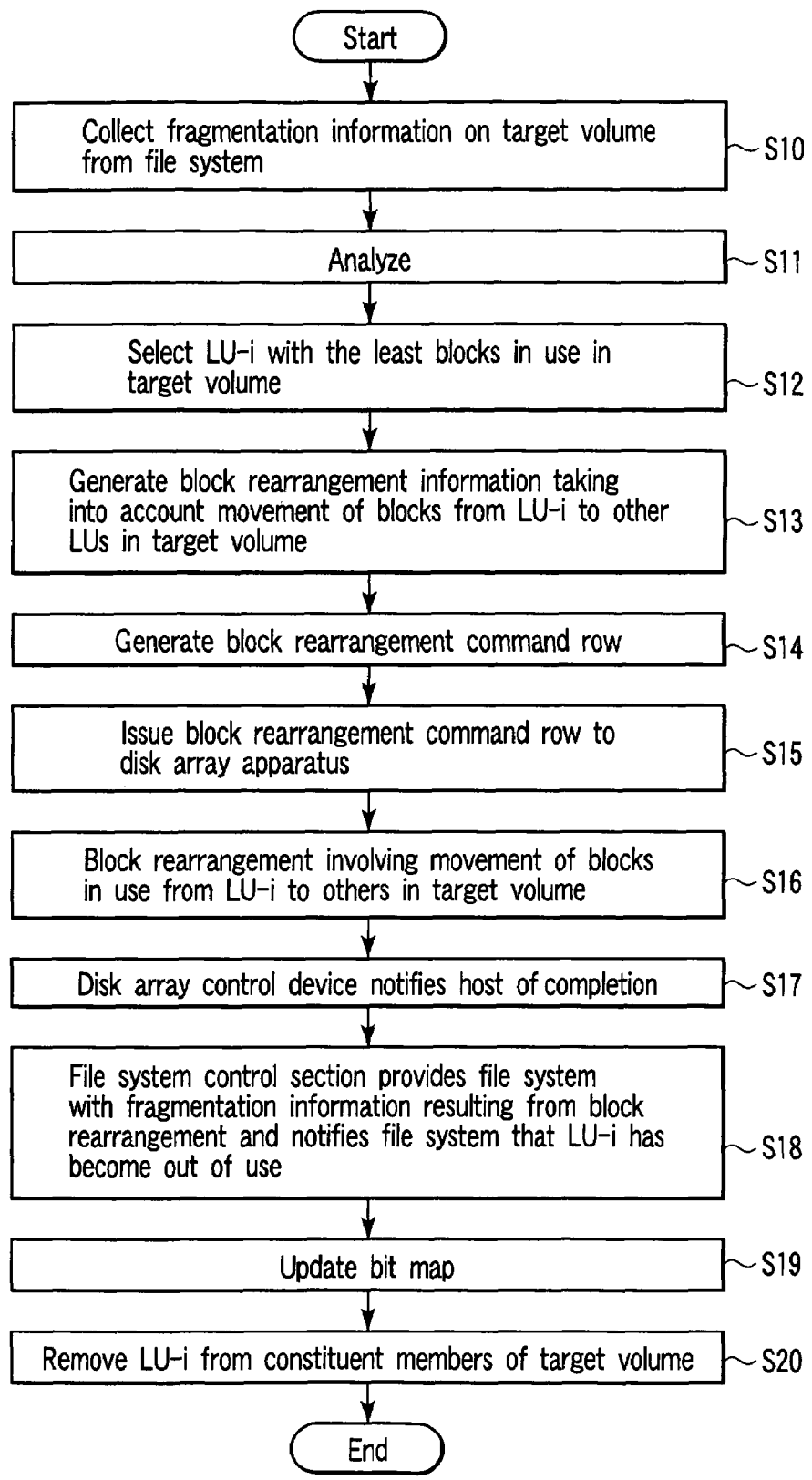
FIG. 8 is a flowchart showing an operation procedure according to a first variation of the embodiment.

Now, a first variation of the above embodiment will be described with reference to the flowchart in FIG. 8. The first variation is characterized in that the fragmentation state of a volume having a plurality of logical units as constituent members is eliminated by rearranging data among the logical units to disconnect at least one whole logical unit from the other constituent members of the corresponding volume to obtain a free logical unit.

It is assumed that the host 20-1 requests that the file system control device 12-1 eliminate the fragmentation state of a volume (referred to as a target volume V below) having particular ones LU-m to LU-n of the logical units LU-1 to LU-n in the disk array 111 (disk array apparatus 11-1) as constituent members.

The fragmentation information collecting section 124a in the file system control section 124 collects fragmentation information indicating the fragmentation state in the target volume (that is, the logical units LU-m to LU-n), from the bit map 122a managed by the file system 122 (step S10).

The analysis section 124b in the file system control section 124 analyzes the fragmentation state in the target volume V (logical units LU-m to LU-n) on the basis of the fragmentation information collected by the fragmentation information collecting section 124a (step S11). On the basis of the results of analysis of the fragmentation state in step S11, the analysis section 124b selects a logical unit LU-i having the least blocks in use, from the logical units LU-m to LU-n, which are the constituent members of the target volume V (step S12). The analysis section 124b generates block rearrangement (movement) information required to rearrange (move) the data in blocks in use in the selected LU-i (LU-n), in the other logical units LU-j in the target volume V, including the logical unit LU-m (the logical units LU-j are LU-m to LU-n except LU-i (LU-n)) to eliminate the fragmentation states of the other logical units LU-j (step S13). The block rearrangement information also specifies block rearrangement for rearranging the blocks in use in consecutive areas in LU-m to LU-n except LU-i (LU-n).

The block rearrangement command generating section 124c in the file system control section 124 generates a block rearrangement command row required for block rearrangement, from the block rearrangement information generated by the analysis section 124b (step S14). The driver 123 in the file system control section 124 issues the block rearrangement command row generated by the block rearrangement generating section 124c to the disk array apparatus 11-1 (step S15).

Figure 9A:
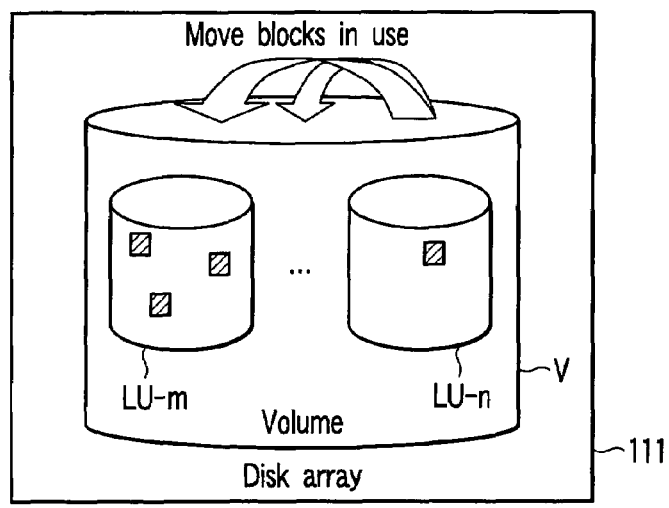
FIGS. 9A to 9C are diagrams showing a variation in the state of one logical unit and in which the whole logical unit is disconnected from the other constituent members of a corresponding volume by rearranging data among logical units, in order to obtain a free logical unit.

The disk array control device 112 in the disk array apparatus 11-1 carries out block rearrangement (movement) involving movement of blocks in use from the logical unit LU-n in the target volume V to the other logical units LU (here, LU-m to LU-n except LU-n) (step S16). FIG. 9A shows how blocks in use are moved among logical units. In step S16, block arrangement (movement) similar to that in the above embodiment is also executed on the logical units LU-m to LU-n except LU-n.

Figure 9B:
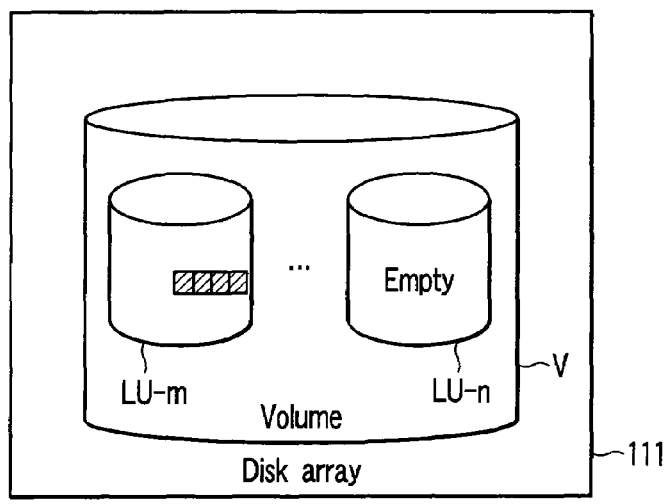

Once the disk array control device 112 has executed all of the block rearrangement command row, it notifies the host 20-1 of completion of the block rearrangement (step S17). FIG. 9B shows the state of the logical units LU-m to LU-n, the constituent members of the target volume V, which state is observed when the block arrangement has been completed. As is apparent from FIG. 9B, in the logical units LU-m to LU-n except the one LU-n, the blocks in use are arranged in consecutive areas. In contrast, no block in use is present in the logical unit LU-n. LU-n is thus empty.

In response to the notification of block rearrangement completion transmitted by the disk array control device 112 to the file system control device 12-1, the file system control section 124 in the file system control section 12-1 provides the file system 122 with fragmentation information indicative of the usage status of each block in the volume V (logical units LU-m to LU-n) after the block rearrangement. The file system control section 124 also notifies the file system 122 that the logical unit LU-i (=LU-n) has become out of use (step S18). In accordance with this notification, the file system 122 updates the bit map 122a managed by itself (step S19).

Figure 9C:
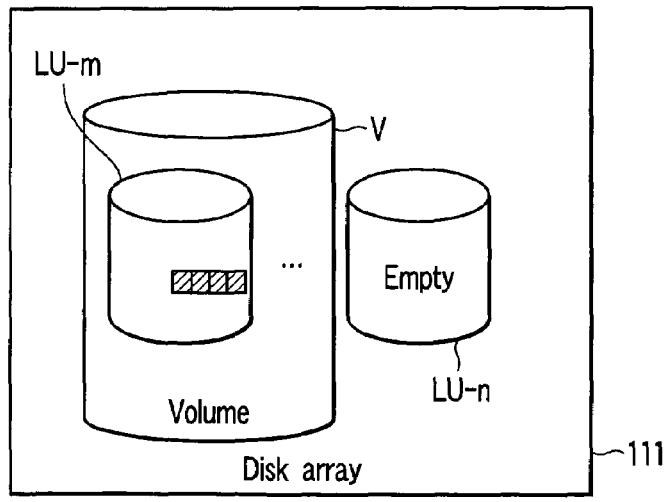
Figure 10:
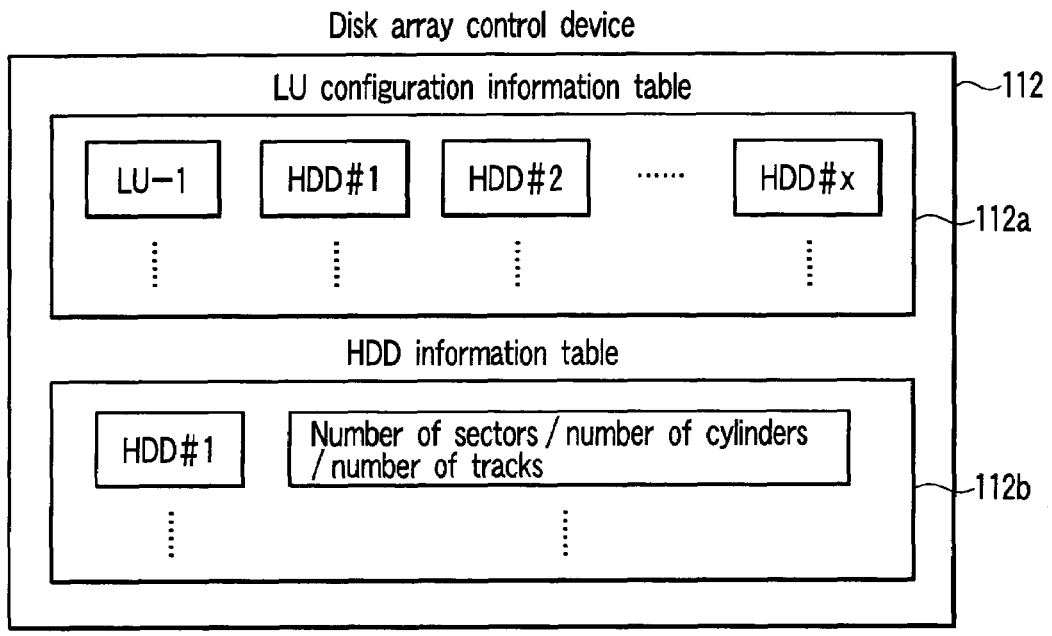
FIG. 10 is a diagram showing an example of the structure of data in an LU configuration information table 112a and an HDD information table 112b applied according to a second variation of the embodiment.

Further, the file system 122 functions as disconnecting means (logical unit disconnecting means) to delete the logical LU-i (=LU-n), which has become out of use, from the other constituent members of the volume V (step S20). In other words, the file system 122 disconnects the logical unit LU-i (=LU-n) from the volume V. This state is shown in FIG. 9C. By disconnecting the logical unit LU-i (=LU-n), having no block in use, from the volume V, the file system 122 can reduce the capacity (size) of the volume. The file system 122 can also allocate the logical unit LU-i (=LU-n) to another volume to increase the capacity of this volume.

In the first variation, block rearrangement is carried out within the same volume. However, the blocks in use in the volume V can be moved to consecutive areas in another volume V'. In this case, the volume V' may be provided in a disk array apparatus different from the one 11-1. With this configuration, the storage resources of the disk array apparatuses 11-1 to 11-N can be effectively utilized.

[Second Variation]

Now, a second variation of the above embodiment will be described.

In the second variation, the disk array control device 112 in the disk array apparatus 11-1 has an LU configuration information table 112a and an HDD information table 112b. The disk array control devices (not shown) in the other disk array apparatuses 11-1 in the storage system 10 have tables similar to the LU configuration information table 112a and HDD information table 112b.

The LU configuration information table 112a is used to hold information indicating, for each of the logical units LU-1 to LU-n in the disk array apparatus 11-1, HDDs providing a stripe group assigned to LU-1 to LU-n, that is, a group of HDDs constituting LU-1 to LU-n. In the example in FIG. 1, each of the logical units LU-1 to LU-n includes (a stripe group provided by) HDD 111-l to 111-x . Accordingly, the logical units LU-1 to LU-n have the same disk configuration information. On the other hand, the HDD information table 112b is used to hold physical information on each HDD in the disk array apparatus. This physical information includes the number of sectors per cylinder of HDD, the number of cylinders per head (disk surface) of HDD, and the total number of tracks in HDD.

Figure 11:
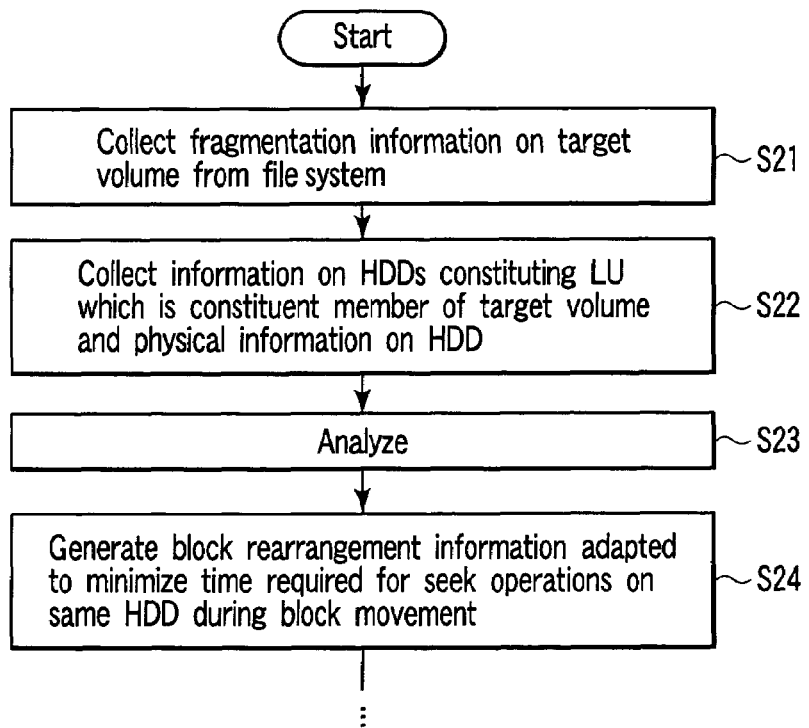
FIG. 11 is a flowchart showing an operation procedure according to the second embodiment.

Now, operations of the second variation of the above embodiment will be described with reference to the flowchart in FIG. 11. In this case, as in the case of the above embodiment, the host 20-1 requests that the file system control device 12-1 eliminate the fragmentation state of a target volume having only the logical unit LU-n in the disk array apparatus 11-1 as a constituent member.

First, the fragmentation information collecting section 124a in the file system control section 124, provided in the file system control device 12-1, collects fragmentation information indicating the fragmentation state in the target volume, from the bit map 122a managed by the file system 122 (step S21). The fragmentation information collecting section 124a also collects information on the HDDs constituting the logical unit (logical unit LU-n) which is the constituent member of the target volume as well as physical information on the HDDs, from the LU configuration information table 112a and HDD information table 112b possessed by the disk array control device 112 in the disk array apparatus 11-1 in which the target volume is present (step S22). In this case, since the logical unit LU-n is the only constituent member of the target volume, the fragmentation information collecting section 124a collects the information on the HDDs 111-1 to 111-x, constituting the logical unit LU-n, and the physical information on the HDDs 111-1 to 111-x.

The analysis section 124b in the file system control section 124 analyzes the fragmentation state in the target volume (that is, the logical unit LU-n) on the basis of the fragmentation information collected by the fragmentation information collecting section 124a (step S23). On the basis of the results of analysis of the fragmentation state in step S23, the analysis section 124b generates block rearrangement information required to eliminate the fragmentation state in the target volume (logical unit LU-n) (step S24).

In the generation of block rearrangement information in step S24, not only the elimination of the fragmentation state but also an increase in the speed at which blocks are moved on the same HDD (block rearrangement) (sequential arrangement that prevents frequent seek operations) are taken into account. Specifically, measures are taken such that to move blocks on the same HDD, the head (read/write head) of the HDD moves in one direction of the disk, for example, from its inner or outer periphery to outer or inner periphery. More specifically, measures are taken such that to rearrange a bloc-in-use row intended for block rearrangement on the disk in the HDD, the head of the HDD move in one direction of the disk so that sequential accesses are carried out which require the shortest time for seek operations in the HDD. The speed of block rearrangement is increased using information on the HDD 111-1 to 111-x, constituting the logical unit LU-n, and physical information on the HDD111-1 to 111-x, both pieces of information being collected by the fragmentation information collecting section 124a. In this case, the physical information (number of sectors/number of cylinders/number of tracks) on the HDDs 111-1 to 111-x is used to calculate the physical position of the head on the HDD (disk) during block movement (rearrangement) taking into account the case in which the capacity values with the HDDs.

The operation after the generation of block rearrangement information in step S24 is similar to that in step S3 in the flowchart of FIG. 4. Accordingly, the description of the operation following step S24 is omitted.

[Third Variation]

Now, a third variation of the above embodiment will be described.

Figure 12:
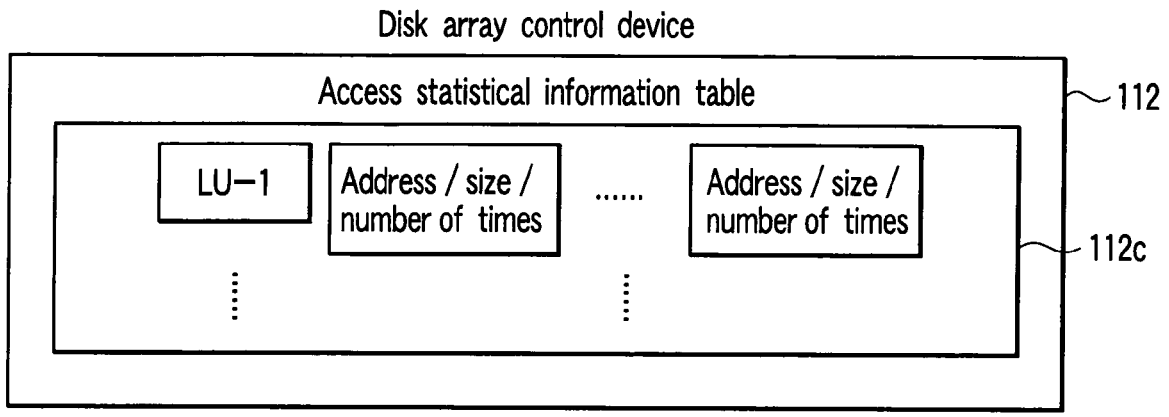
FIG. 12 is a diagram showing an example of the structure of data in an access statistical information table 112c applied according to a third variation of the embodiment.

In the third variation, the disk array control device 112 in the disk array apparatus 11-1 has an access statistical information table 112c as shown in FIG. 12. The disk array control devices (not shown) in the other disk array apparatuses in the storage system 10 have tables similar to the access statistical table 112c.

The access statistical information table 112c holds access statistical information on each of the logical units LU-1 to LU-n in the disk array apparatus 11-1. The access statistical information on the logical unit LU-i (i=1 to n) indicates the tendency of accesses to LU-i made in response to access requests from the (applications on the) hosts 20-1 to 20-X, that is, an access pattern. In this case, the access statistical information contains an address (logical address) and a size, and the number of accesses, per unit time, to an area (logical area) of that size starting at that address (address/size/number of accesses).

Figure 13:
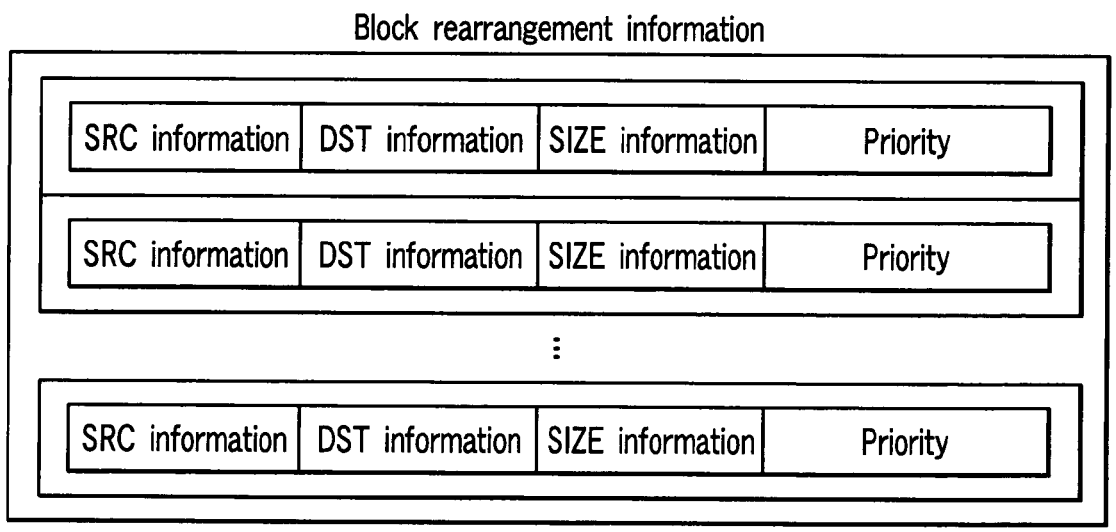
FIG. 13 is a diagram showing the format of block rearrangement information applied according to the third variation of the embodiment.
Figure 14:
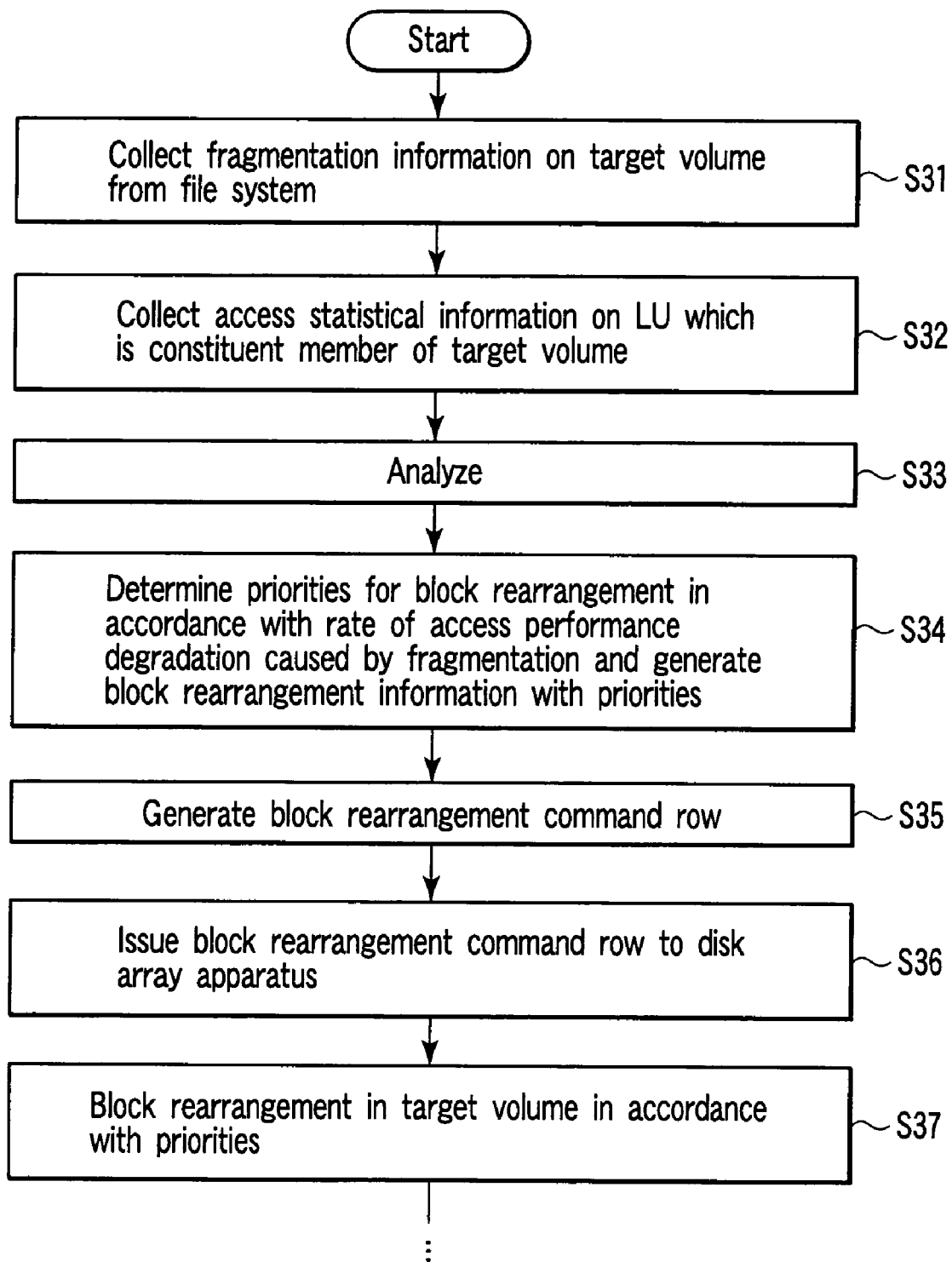
FIG. 14 is a flowchart showing an operation procedure according to the third variation.

Now, operations of the third variation of the above embodiment will be described with reference to FIGS. 13 and 14. As in the case of the above embodiment, the host 20-1 requests that the file system control device 12-1 eliminate the fragmentation state of a target volume having only the logical unit LU-n in the disk array apparatus 11-1 as a constituent member. FIG. 13 is a diagram showing the format of block rearrangement information applied in the third variation. FIG. 14 is a flowchart showing an operation procedure according to the third variation.

First, the fragmentation information collecting section 124a in the file system control section 124, provided in the file system control device 12-1, collects fragmentation information indicating the fragmentation state in the target volume, from the bit map 122a managed by the file system 122 (step S31). The fragmentation information collecting section 124a also collects access statistical information on the logical unit (logical unit LU-n) which is the constituent member of the target volume, from the access statistical information table 112c in the disk array control device 112 in the disk array apparatus 11-1 in which the target volume is present (step S32).

The analysis section 124b in the file system control section 124 analyzes the fragmentation state in the target volume V (that is, the logical unit LU-n) on the basis of the fragmentation information collected by the fragmentation information collecting section 124a (step S33). On the basis of the results of analysis of the fragmentation state in step S33 and the access statistical information collected by the fragmentation information collecting section 124a, the analysis section 124b generates block rearrangement information required to eliminate the fragmentation state in the target volume (logical unit LU-n) (step S34).

In the generation of block rearrangement information in step S34, priorities for block rearrangement are determined as described below for the respective areas intended for the block arrangement so as not only to eliminate the fragmentation state but also to prevent block moving operations from affecting accesses (referred to as normal accesses) of the application to the volume.

First, on the basis of the access statistical information "address/size/number of accesses" and "fragmentation information", the analysis section 124b calculates, as follows, how the performance is degraded by fragmentation if normal accesses are made to a certain area. It is assumed that an access is made to a 1-MB area (logical area) starting at an address C000 on the logical unit LU-n and that this area is divided, in the HDD, into eight physically inconsecutive 128-KB areas. In this case, when the corresponding access statistical information is "address=C000/size=1 MB/the number of accesses per unit time=N", then the rate of volume access performance degradation attributed to fragmentation is 8 (the number of divisions)×N (the number of accesses per unit time).

The analysis section 124b calculates the rate of volume access performance degradation for each area intended for block rearrangement. The analysis section 124b then compares the rates of volume access performance degradation for these areas with one another. The analysis section 124b thus searches for areas with relatively high rates of degradation (for example, 128 KB×8 or 64 KB×100) to sequentially determine priorities. The analysis section 124b generates block rearrangement information required to eliminate the fragmentation for each of the areas intended for block rearrangement. The analysis section 124b adds the priorities determined as described above, to the block arrangement information obtained. FIG. 13 shows an example of the format of block rearrangement information with the priorities.

The block rearrangement command generating section 124c generates a block rearrangement command row with the priorities which is required for block rearrangement, from the block rearrangement information with the priorities generated by the analysis section 124b (step S35). The driver 123 issues the block rearrangement command row with the priorities to the disk array apparatus 11-1 via the network 13 (step S36).

Upon receiving the block rearrangement command row with the priorities issued by the driver 123, the disk array control device 112 in the disk array apparatus 11-1 functions as block rearranging means to execute the command row. Thus, the disk array control device 112 uses a priority control mechanism (not shown) to execute a block rearranging process of sequentially placing (moving) the data in the block-in-use rows (or blocks in use) in the target volume (in this case, the logical unit LU-n constituting the target volume), at the respective specified rearrangement destinations in the volume (logical unit LU-n) in accordance with the corresponding priorities (step S37). Thus, in the above example, if the rate of performance degradation is higher in the 8 physically inconsecutive 128-KB areas (former areas) than in the 100 physically inconsecutive 64-KB areas (latter areas), priority is given to the block rearrangement of the latter areas.

Thus, by varying the priorities for block rearrangement in accordance with the rate of volume access performance degradation caused by fragmentation, it is possible to maintain a fixed access performance for normal accesses (read/write accesses of the application to volumes) as much as possible.

The operation after the execution of block rearrangement in accordance with the block rearrangement command row in step S37 is similar to that in step S6 in the flowchart of FIG. 4. Accordingly, the description of the operation following step S37 is omitted.

[Fourth Variation]

Figure 15:
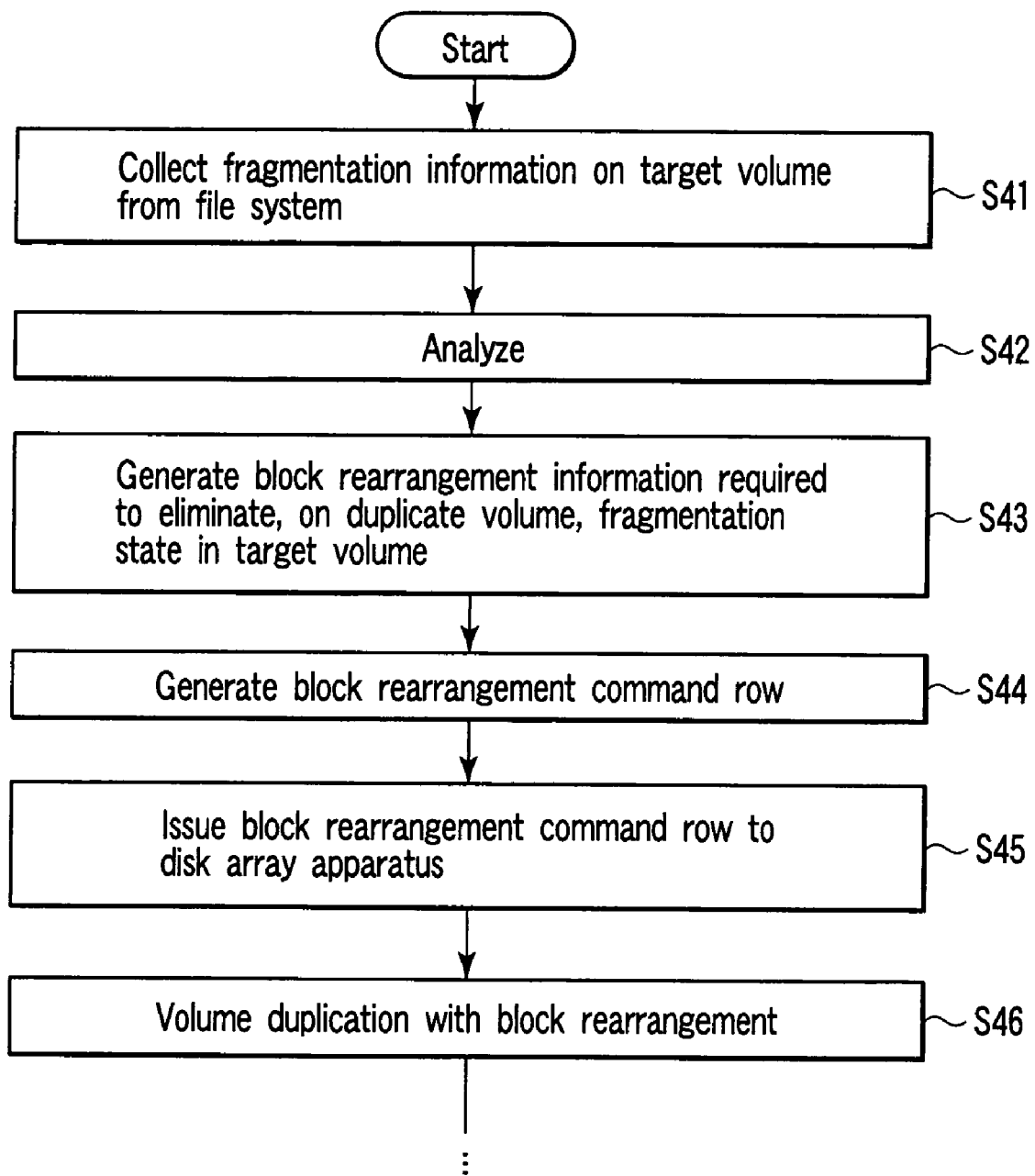
FIG. 15 is a flowchart showing an operation procedure according to a fourth variation of the embodiment.

Now, a fourth variation of the above embodiment will be described with reference to the flowchart in FIG. 15. In the fourth variation, it is assumed that the storage system 10 in FIG. 1 is configured to be able to duplicate a volume (a duplicate volume is obtained from a master volume). The fourth variation is characterized in that block rearrangement is automatically carried out when a duplicate volume is created from the master volume.

Figure 16:
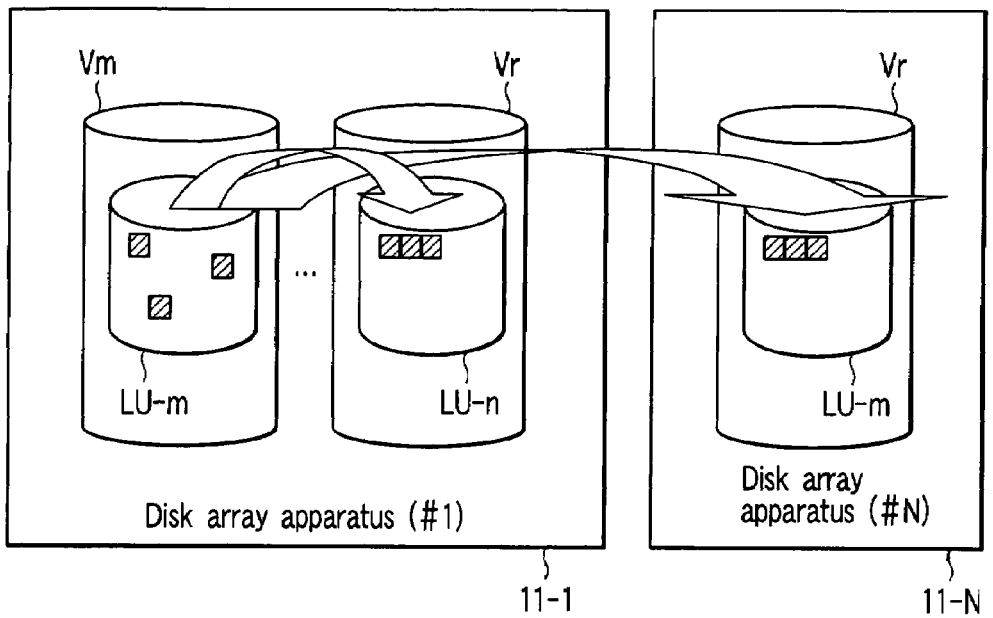
FIG. 16 is a diagram showing volume duplication according to the fourth variation.

It is assumed that the logical unit LU-m in the (disk array 111 provided in the) disk array apparatus 11-1 is defined as a constituent member of a volume Vm as shown in FIG. 16. In this state, for example, under the control of the file system control device 12-1, the volume Vm is used as a master volume to create duplicate volumes Vr of the master volume Vm in the (logical unit LU-n in the) disk array apparatus (#1) 11-1 and in the (logical unit LU-m in the) disk array apparatus (#N)11-N.

In this case, the fragmentation information collecting section 124a in the file system control section 124 collects fragmentation information indicating the fragmentation state in the target volume (that is, the logical unit LU-m), from the bit map 122a managed by the file system 122 (step S41).

The analysis section 124b in the file system control section 124 analyzes the fragmentation state in the target volume Vm (that is, the logical unit LU-m) on the basis of the fragmentation information collected by the fragmentation information collecting section 124a (step S42). On the basis of the results of analysis of the fragmentation state in step S42, the analysis section 124b generates block rearrangement information required to eliminate, on the duplicate volumes Vr, the fragmentation state in the target volume (logical unit LU-m) (step S43).

The block rearrangement command generating section 124c generates block rearrangement command rows for the disk array apparatuses 11-1 and 11-N, for which duplicate volumes need to be created, from the block rearrangement information generated by the analysis section 124b (step S44). In this case, the block rearrangement command generating section 124c generates a block rearrangement command row for the logical unit LU-n constituting the duplicate volume Vr on the disk array apparatus 11-1 from the logical unit LU-m constituting the master volume Vm on the disk array apparatus 11-1. The block rearrangement command generating section 124c also generates a block rearrangement command row for the logical unit LU-m constituting the duplicate volume Vr on the disk array apparatus 11-N from the logical unit LU-m constituting the master volume Vm on the disk array apparatus 11-1.

The driver 123 issues the block rearrangement command rows generated by the block rearrangement command generating section 124c to the source and destination disk array apparatuses, that is, the disk array apparatuses 11-1 and 11-N, via the network 13 (step S45).

Thus, in the fourth variation, in performing a synchronous operation (duplicate operation) of creating duplicate volumes Vr for the disk array apparatuses 11-1 and 11-N from the volume Vm on the disk array apparatus 11-1, the file system control section 124 generates a block rearrangement command row required to eliminate the fragmentation state on the duplicate volumes Vr. The file system control section 124 then transmits the block rearrangement command row to the disk array apparatuses 11-1 and 11-N.

Upon receiving the block rearrangement command row sent by the driver 123 in the file system control device 12-1, the disk array control device 112 in the disk array apparatus 11-1 and the disk array control device (not shown) in the disk array apparatus 11-N function as block rearranging means and cooperate with each other in executing the command row (step S46). This results in the creation of duplicate volumes Vr (logical units LU-n and LU-m) in the disk array apparatuses 11-1 and 11-N as shown in FIG. 16: the duplicate volumes Vr (logical units LU-n and LU-m) correspond to the master volume Vm (logical unit LU-m) in the disk array apparatus 11-1 and have been subjected to block rearrangement required to eliminate the fragmentation state. In other words, the duplicate volume Vr is created by moving blocks in LU-m in the disk array apparatus 11-1 to LU-n in the same disk array apparatus 11-1. The duplicate volume Vr is also created by moving blocks in LU-m in the disk array apparatus 11-1 to LU-m in the disk array apparatus 11-N.

The operation after the execution of block rearrangement in accordance with the block rearrangement command row in step S46 is similar to that in step S6 in the flowchart of FIG. 4. Accordingly, the description of the operation following step S46 is omitted.

[Fifth Variation]

Figure 17:
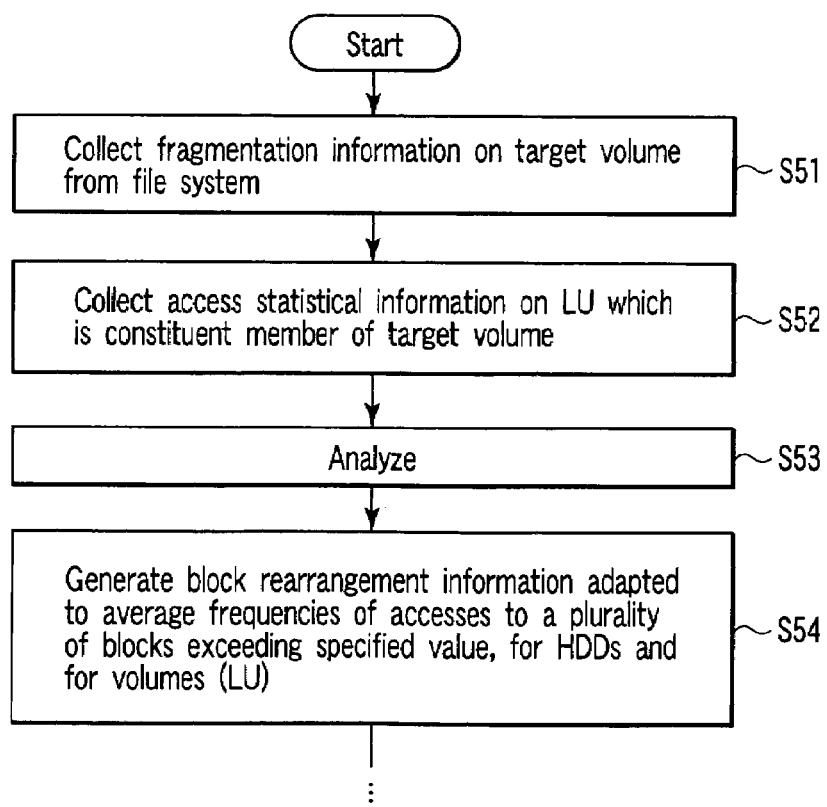
FIG. 17 is a flowchart showing an operation procedure according to a fifth variation of the embodiment.

Now, a fifth variation of the above embodiment will be described with reference to the flowchart in FIG. 17. In the fifth variation is characterized in that block rearrangement is utilized to distribute a load and that the access statistical information table 112c is utilized to distribute the load.

The file system control section 124 in the file system control device 12-1 collects fragmentation information indicating the fragmentation state in the volume on each of the disk array apparatuses 11-1 to 11-N, from the bit map 122a managed by the file system 122 (step S51). Further, the fragmentation information collecting section 124a collects, from the access statistical information table 112c, access statistical information on each of the logical units which are the constituent members of the volume on the disk array apparatus 11-1 (step S52). In step S52, the fragmentation information collecting section 124a also collects access statistical information on each of the logical units which are the constituent members of each of the volumes on all the disk array apparatuses except the one 11-1.

The analysis section 124b in the file system control section 124 analyzes the fragmentation state and access pattern of (the logical units constituting) each volume on the basis of the fragmentation information collected by the fragmentation information collecting section 124a (step S53). On the basis of the results of analysis of the fragmentation state and access pattern, the analysis section 124b detects, in each volume, areas (logical areas) having an access frequency exceeding a specified value. The analysis section 124b then generates block rearrangement information required to distribute (rearrange) a group of blocks in each area among the plurality of HDDs constituting the corresponding volume so as to average accesses to the block group for the HDDs and for the volumes.

Subsequent operations are almost similar to those in the above embodiment. That is, the block rearrangement command generating section 124c in the file system control section 124 generates a block rearrangement command row required for block rearrangement, for each of the disk array apparatuses 11-1 and 11-N on the basis of the block rearrangement information generated by the analysis section 124b. Then, the driver 123 in the file system control device 12-1 issues the block rearrangement command rows for the disk array apparatuses 11-1 to 11-N generated by the block rearrangement command generating section 124c, to the disk array apparatuses 11-1 and 11-N via the network 13. The disk array control devices in the disk array apparatuses 11-1 to 11-N rearrange the data among the blocks (move the data blocks) on the basis of the block rearrangement commands issued by the driver 123 in the file system control device 12-1. Thus, if accesses concentrate on a particular block group, the accesses to this block group can be distributed among a plurality of HDDs, that is, the load can be distributed. Even if the volume is defined for a plurality of disk arrays, the load can be similarly distributed.

Thus, in the fifth variation, the load can be distributed by block rearrangement on the basis of the tendency of accesses (disk utilization) indicated by the access statistical information tables held in the disk array apparatuses 11-1 to 11-N. Thus, the storage resources of the disk array apparatuses 11-1 to 11-N can be effectively utilized.

As described above in detail, according to the present invention, by utilizing the high-speed access control function of the disk array control device to physically move data so as to eliminate the fragmentation state in a volume, it is possible to promptly eliminate the fragmentation in the volume without increasing the load on the host or file system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage system, interconnected by a first network with a plurality of host computers sharing the storage system, comprising:
a plurality of disk array apparatuses, one of the plurality of disk array apparatuses having a disk array control device which controls a disk array includes a plurality of disk drives and which analyzes a file-level access request from one of the plurality of host computers to convert the file-level access request into an access request for one of the plurality of disk drives which correspond to the file-level access request; and
a plurality of file system control devices interconnected by a second network with the plurality of disk array apparatuses, one of the plurality of file system control devices including a file system which manages a file specified in the access request from the one of the plurality of host computers, the one of the plurality of file system control devices receiving the access request from the one of the plurality of host computers to output the request to the one of the plurality of disk array apparatuses,
the one of the plurality of file system control devices comprising:
a fragmentation information collecting section which collects, from the file system, fragmentation information indicative of usage of blocks in a target volume for which a fragmentation state is to be eliminated, the target volume being included in those volumes in which the file managed by the file system is stored;
an analysis section which analyzes the fragmentation state of the target volume on the basis of the fragmentation information collected by the fragmentation information collecting section, to generate block rearrangement information required to rearrange blocks in use in the target volume, in consecutive areas in the volume; and
a block rearrangement command generating section which generates a block rearrangement command row required to cause the disk array control device to execute block rearrangement indicated by the block rearrangement information, the block rearrangement command generating section issuing the command row to the disk array control device,
the disk array control device comprising:
a block rearranging section which controls the disk array in accordance with the block rearrangement command row issued by the block rearrangement command generating section, to execute a block rearranging process of moving the data in the blocks in use in the target volume to the consecutive areas, and
an access statistical information table which holds, for each of the logical units constituting the volume, access statistical information containing a logical address and a size of an area targeted by accesses, and a number of accesses per unit time to the area,
the fragmentation information collecting section collects the access statistical information on the logical units constituting the target volume from the access statistical information table of the disk array control device when collecting fragmentation information on the target volume,
the analysis section calculates, on the basis of results of analysis of the fragmentation state of the target volume and the access statistical information collected by the fragmentation information collecting section, a rate of access performance degradation caused by the fragmentation, for each area indicated by the access statistical information, from the number of accesses per unit time to the area and a number of physically inconsecutive areas into which the area is divided, determines priorities in block rearrangement for rearranging blocks in use in the area to be physically consecutive in accordance with the rate of access performance degradation, and generates the block rearrangement information with the priorities,
the block rearrangement command generating section generates a block rearrangement command row with the priorities added to each command, from the block rearrangement information with the priorities, and the block rearranging section executes, in accordance with the corresponding priorities, a block rearranging process for each command on the basis of the block rearrangement command row.

2. A method of controlling block rearrangement, the method being used in a storage system which is interconnected by a first network with a plurality of host computers sharing the storage system, comprising a plurality of disk array apparatuses, one of the plurality of disk array apparatuses having a disk array control device which controls a disk array includes a plurality of disk drives and which analyzes a file-level access request from one of the plurality of host computers to convert the file-level access request into an access request for one of the plurality of disk drives which correspond to the file-level access request, and a plurality of file system control devices interconnected by a second network with the plurality of disk array apparatuses, one of the plurality of file system control devices including a file system which manages a file specified in the access request from the one of the plurality of host computers, the one of the plurality of file system control devices receiving the access request from the one of the plurality of host computers to output the request to the one of the plurality of disk array apparatuses, the disk array control device being used to execute block rearrangement required to eliminate a fragmentation state, the method comprising:

collecting, from the file system, fragmentation information indicative of usage of blocks in a target volume for which the fragmentation state is to be eliminated, the target volume being included in those volumes in which the file managed by the file system is stored;

collecting, from an access statistical information table which holds, for each of the logical units constituting the volume, access statistical information containing a logical address and a size of an area targeted by accesses, and a number of accesses per unit time to the area, the access statistical information on the logical units constituting the target volume from the access statistical information table of the disk array control device when collecting fragmentation information on the target volume;

analyzing the fragmentation state of the target volume on the basis of the collected fragmentation information;

calculating, on the basis of results of analysis of the fragmentation state of the target volume and the collected access statistical information, a rate of access performance degradation caused by the fragmentation, for each area indicated by the access statistical information, from the number of accesses per unit time to the area and a number of physically inconsecutive areas into which the area is divided, determining priorities in block rearrangement for rearranging blocks in use in the area to be physically consecutive in accordance with the rate of access performance degradation, and generating the block rearrangement information with the priorities;

generating a block rearrangement command row required to cause the disk array control device to execute block rearrangement indicated by the generated block rearrangement information; and issuing the generated command row to the disk array control device to cause the disk array control device to execute a block rearranging process of moving the data in the blocks in use in the target volume to the consecutive areas.

3. A storage medium which stores program code applied to a storage system, which is interconnected by a first network with a plurality of host computers sharing the storage system, comprising a plurality of disk array apparatuses, one of the plurality of disk array apparatuses having a disk array control device which controls a disk array includes a plurality of disk drives and which analyzes a file-level access request from one of the plurality of host computers to convert the file-level access request into an access request for one of the plurality of disk drives which correspond to the file-level access request, the program code being used to execute processing on a plurality of file system control devices interconnected by a second network with the plurality of disk array apparatuses, one of the plurality of file system control devices including a file system which manages a file specified in the access request from the one of the plurality of host computers, the one of the plurality of file system control devices receiving the access request from the one of the plurality of host computers to output the request to the one of the plurality of disk array apparatuses, the program code, when executed, causing a processor to execute a method comprising:

collecting, from the file system, fragmentation information indicative of usage of blocks in a target volume for which the fragmentation state is to be eliminated, the target volume being included in those volumes in which the file managed by the file system is stored;

collecting, from an access statistical information table which holds, for each of the logical units constituting the volume, access statistical information containing a logical address and a size of an area targeted by accesses, and a number of accesses per unit time to the area, the access statistical information on the logical units constituting the target volume from the access statistical information table of the disk array control device when collecting fragmentation information on the target volume;

analyzing the fragmentation state of the target volume on the basis of the fragmentation information collected;

calculating, on the basis of results of analysis of the fragmentation state of the target volume and the collected access statistical information, a rate of access performance degradation caused by the fragmentation, for each area indicated by the access statistical information, from the number of accesses per unit time to the area and a number of physically inconsecutive areas into which the area is divided, determining priorities in block rearrangement for rearranging blocks in use in the area to be physically consecutive in accordance with the rate of access performance degradation, and generating the block rearrangement information with the priorities; and generating a block rearrangement command row required to cause the disk array control device to execute block rearrangement indicated by the block rearrangement information generated and issuing the command row to the disk array control device to cause the disk array control device to execute a block rearranging process of moving the data in the blocks in use in the target volume to the consecutive areas.

* * * * *